(12) United States Patent
Ozaka et al.

(10) Patent No.: US 6,926,940 B2
(45) Date of Patent: Aug. 9, 2005

(54) RESIN MOLDED ARTICLES AND METHOD OF MANUFACTURING THE SAME

(75) Inventors: Yuji Ozaka, Okazaki (JP); Mitsumasa Seko, Kariya (JP); Tsutomu Onoue, Kariya (JP); Manabu Ishiguro, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/437,602

(22) Filed: May 14, 2003

(65) Prior Publication Data

US 2003/0215586 A1 Nov. 20, 2003

(30) Foreign Application Priority Data

May 16, 2002 (JP) ........................................ 2002-141065

(51) Int. Cl.⁷ ............................ B27M 3/00; B27W 5/02
(52) U.S. Cl. ..................... 428/36.5; 428/35.7; 428/159; 428/213; 428/304.4; 428/339; 62/288; 62/297; 62/530; 312/229; 312/236
(58) Field of Search ............................ 428/35.7, 36.5, 428/158, 159, 160, 212, 213, 218, 220, 304.4, 316.6, 332, 339; 62/244, 285, 288, 297, 530; 454/69, 143; 312/229, 236

(56) References Cited

U.S. PATENT DOCUMENTS 4,473,665 A   9/1984   Martini-Vvedensky et al.
6,685,875 B2 * 2/2004   Usui et al. .................. 264/554

FOREIGN PATENT DOCUMENTS

JP          4-215544         8/1992

* cited by examiner

*Primary Examiner*—Michael C. Miggins
(74) *Attorney, Agent, or Firm*—Harness, Dickey & Pierce, PLC

(57) ABSTRACT

In a method of manufacturing a resin molded article, resin including a foaming agent is injected into a cavity defined in a mold assembly. Then, a movable mold of the mold assembly is moved to partly expand the cavity so that the foaming is promoted at the part where the cavity is expanded. Therefore, a high foamed portion having voids therein and a low foamed portion having an expansion ratio less than that of the high foamed portion are integrally formed in the resin molded article.

9 Claims, 5 Drawing Sheets

RESIN MOLDED ARTICLES AND METHOD OF MANUFACTURING THE SAME

CROSS REFERENCE TO RELATED APPLICATION

This application is based on Japanese Patent Application No. 2002-141065 filed on May 16, 2002, the disclosure of which is incorporated herein by reference.

FIELD OF THE INVENTION

The present invention relates to resin molded articles and a method of manufacturing the same. More particularly, the present invention relates to resin molded articles defining voids therein and a method of manufacturing the same.

BACKGROUND OF THE INVENTION

As an example of a resin molded article, there is an air conditioning case of a vehicular air conditioning unit shown in FIG. 8. As shown in FIG. 8, the air conditioning case 101 includes a top case 111, a bottom case 112, and thermal protection sheets 120. An evaporator 102 is provided in the case 101. The top and bottom cases 111, 112 are molded articles without having foam structure therein. The thermal protection sheets 120 are molded articles having foam structure.

Generally, when heat on an outer periphery of the case is absorbed by the evaporator and the condensed water, dew drops are generated on the outer faces of the case. In the case 101, the thermal protection sheets 120 are arranged at portions where the case 101 makes contact with the evaporator 102 and where condensed water from the evaporator 102 flows to restrict generation of the dew drops and further to restrict the dew drops from falling in a passenger compartment.

In manufacturing the case 101, the top case 111, the bottom case 112 and the thermal protection sheet 120 are separately molded, and then the thermal protection sheets 120 are fixed in the top case 111 and the bottom case 112. Therefore, a manufacturing process is complicated.

As another example of the resin molded article, JP-B2-2625576 (U.S. Pat. No. 4,473,665) discloses a method of producing an article having foam structure therein. According to the method, voids are uniformly formed in the article, even at a portion where the foam structure is not required. Therefore, if an air conditioning case is produced by the method, the size of the case is likely to increase to ensure strength of portions where the foam structure is not required.

SUMMARY OF THE INVENTION

The present invention is made in view of the foregoing disadvantages and it is an object of the present invention to provide resin molded articles and a method of manufacturing the same by a simple process and without increasing in size of the articles.

According to a resin molded article of the present invention, a first wall defining voids therein and a second wall having an expansion ratio less than that of the first wall are integrally molded.

Accordingly, it is unnecessary to separately mold articles having different expansion ratio and to assemble them together. Therefore, it makes a manufacturing process simple. Since the first wall having the expansion ratio higher than that of the second wall is partly formed in the molded article, the molded article is compact. Also, thermal conductivity difference can be created in the single molded article.

According to a method of manufacturing a resin molded article of the present invention, resin including a foaming agent is injected into a cavity defined in a mold assembly first and then foamed in the cavity. The foaming of the resin is partly promoted by a foam-promoting device provided in the mold assembly, thereby creating expansion ratio difference in the molded article.

According to the method, the molding article having expansion ratio difference therein can be produced.

Preferably, the foaming is partly promoted by partly expanding the cavity by a movable core. Alternatively, a mold wall defining the cavity can be partly vibrated by a vibrator. Further, temperature difference can be created in the mold wall by a temperature difference generating means.

In place of partly promoting the foaming by the foam-promoting device, the cavity can be partly narrowed by a movable core so that the expansion ratio of the molded article can be partly reduced at the narrowed part.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

[First Embodiment]

Figure 1:
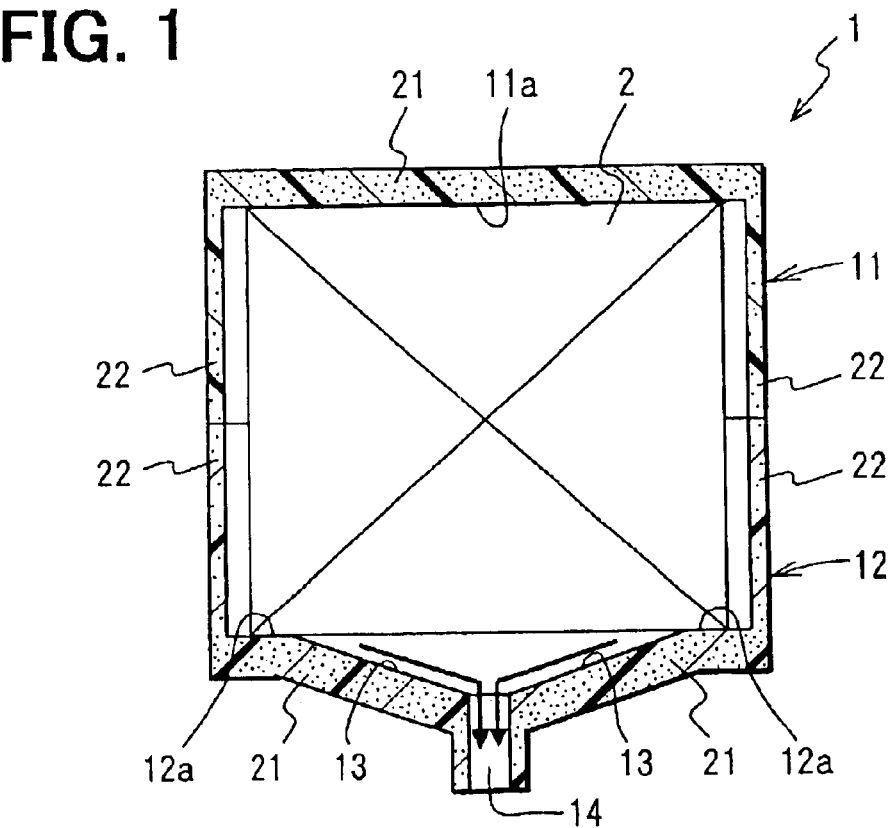
FIG. 1 is a schematic cross-sectional view of an air conditioning case produced by resin molding according to the first embodiment of the present invention.

A resin molded article of the embodiment forms an air conditioning case 1, as shown in FIG. 1. FIG. 1 shows a schematic cross-sectional view of the case 1 in which an evaporator 2 is arranged. The case 1 includes a first case (top case) 11 and a second case (bottom case) 12. The first case 11 has a contact portion 11a that makes contact with the evaporator 2 on its inside surface (inside top surface in FIG. 1). Also, the second case 12 has contact portions 12a that make contact with the evaporator 2 on ends of its inside surface (inside bottom surface in FIG. 1).

The second case 12 has a drain port 14 in its bottom middle. Condensed water generated on surfaces of the evaporator 2 is discharged from the case 1 through the drain port 14. Walls 13 between the contact portions 12a and the drain port 14 are sloped so that the condensed water flows toward the drain port 14.

The first case 11 and the second case 12 are made of polypropylene and have foam structure (voids) therein. Each of the first and the second cases 11, 12 has a high foamed portion 21 and a low foamed portion 22 that have different expansion ratios. In the first case 11, the top wall, which forms the contact portion 11a inside, is formed of the high foamed portion 21. Also, wall of the first case 11 other than the top wall are formed of the low foamed portion 22. In the second case 12, the bottom wall, which forms the contact portions 12a, the sloped walls 13 and the drain port 14, is formed of the high foamed portion 12. Also, the walls other than the bottom wall are formed of the low foamed portion 22.

In this embodiment, an expansion ratio of the high foamed portion 21 to a part without having foam structure (non-foamed portion) is approximately 4.0. Also, an expansion ratio of the low foamed portion 22 to the non-foamed portion is approximately in a range 1.1 to 1.2. Therefore, the first case 11 and the second case 12 are provided by the resin molded products that have thermal insulation at the high foamed portion 21 and reduces weight at low foamed portion 22 while maintaining strength.

Next, a method of manufacturing the case 1 will be described. Because the first case 11 and the second case 12 are produced in a similar manner, the method will be described mainly in a case of the second case 12.

Figure 2:
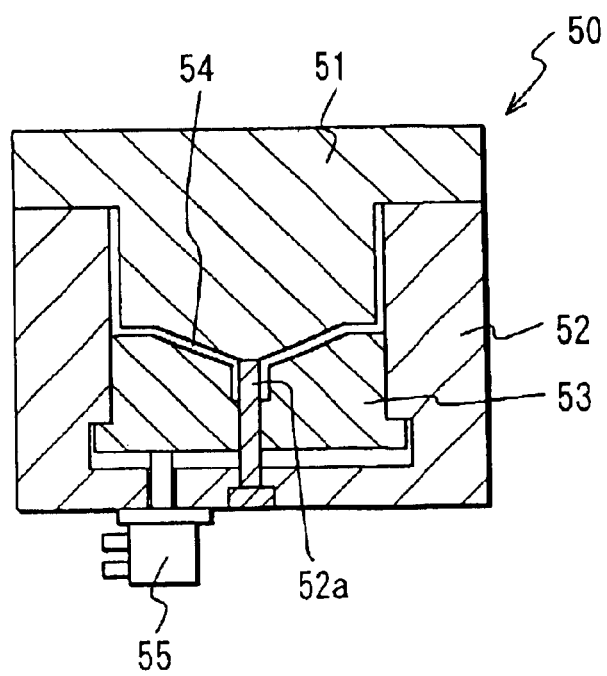
FIG. 2 is a schematic cross-sectional view of a mold assembly according to the first embodiment of the present invention.

As shown in FIG. 2, a mold assembly 50 for injection molding includes a fixed mold 51 and a movable mold 52. A mold cavity 54 is formed between the fixed mold 51 and the movable core 52 when the fixed mold 51 is joined with the movable mold 52.

The movable mold 52 is provided with a pin 52 at its inner middle portion for forming the drain port 14. Also, the movable mold 52 includes a movable core 53 that is movably supported in a top and bottom direction in FIG. 2. The movable core 53 is connected to an actuator 55 that is provided outside of the movable mold 52 as a movable core-driving means. The movable core 53 is moved in the top and bottom direction by operation of the actuator 55, thereby changing a volume of the cavity 54.

In the embodiment, a hydraulic actuator having a hydraulic cylinder is used as the actuator 55. Further, as an example of the actuator 55, a pneumatic actuator and a motor-driven actuator can be used.

Figure 3A:
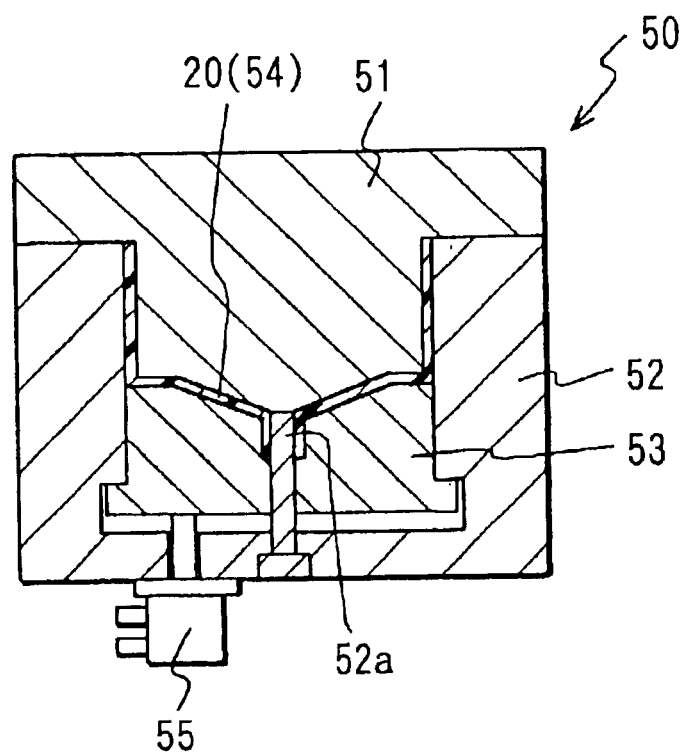
FIG. 3A is a schematic cross-sectional view of the mold assembly for explaining an injecting step of a method of manufacturing a resin molded article according to the first embodiment of the present invention.

In molding the case 12, first, the fixed mold 51 and the movable mold 52 are joined as shown in FIG. 3A. Then, a molten resin 20 including a foaming agent is injected from a gate (not shown) into the mold cavity 54. In the embodiment, polypropylene resin is used as the resin 20. Nitrogen molecules in a supercritical liquid state are contained in the resin 20 as the foaming agent.

A supercritical liquid is defined as a material maintained under a pressure over a critical pressure and a temperature over a critical temperature. Under that condition, the material is in a supercritical liquid state. $N_2$ (nitrogen) used as the foaming agent is in a supercritical state when maintained under a pressure over 3.4 MPa and a temperature over −147 degrees Celsius.

The supercritical liquid is characterized by acting as gas and liquid. Therefore, supercritical liquid nitrogen is readily diffused and mixed in the polypropylene resin. In the embodiment, supercritical liquid nitrogen of 0.6 percent by weight is included in the resin 20.

Figure 3B:
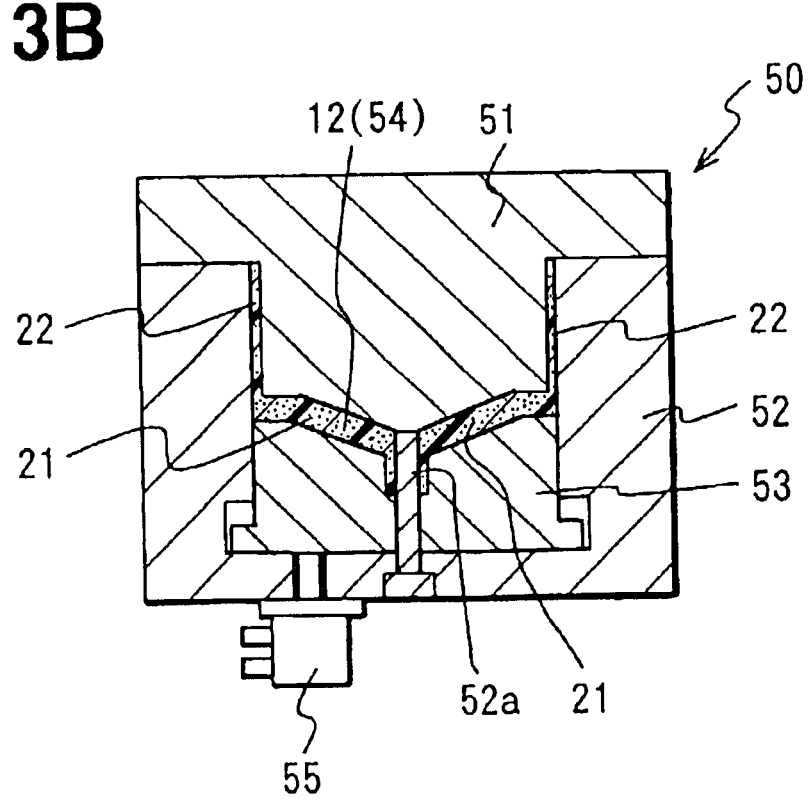
FIG. 3B is a schematic cross-sectional view of the mold assembly for explaining a foaming step of the method according to the first embodiment of the present invention.

After the resin 20 is injected into the mold cavity 54, as shown in FIG. 3B, the movable core 53 is moved in a direction expanding the volume of the cavity 54 (downward in FIG. 3), by operation of the actuator 55. In the embodiment, a mold temperature is 15 degrees Celsius. The movable core 53 is moved approximately two seconds later a completion of the resin injection.

The supercritical liquid nitrogen in the resin 20 gradually vaporizes immediately after injected in the cavity 54 and forms foam nuclei. As the vaporization of the supercritical liquid nitrogen continues, foam nuclei grow and forms voids, thereby forming foam structure in the resin 20. At a part where the cavity 54 is expanded by movement of the movable core 53, forming of the foam nuclei is accelerated or promoted, thereby increasing the expansion ratio.

In this way, the second case 12 in which the high foamed portion 21 and the low foamed portion 22 are integrally molded is produced. Since the expansion ratio of the high foamed portion 21 is approximately 4.0, voids may be communicated therein. However, thin resin layers (skin layers) are formed on the surfaces of the molded product. Therefore, the wall of the second case 12 does not have communication structure allowing communication between the inside surface and the outside surface.

In the manufacturing method, the step shown in FIG. 3A is referred to as an injecting step and the step shown in FIG. 3B is referred to as a foaming step.

According to the above method, it is possible to create expansion ratios difference in a single article. Therefore, it is unnecessary to separately mold articles having different expansion ratios and to assemble then together to make the first case 11 and the second case 12. Accordingly, a manufacturing process is simple. Further, the high foamed portions 21 are formed partly in the first case 11 and the second case 12, respectively. Therefore, the resin molded article is compact.

The high foamed portion 21 has a thermal conductivity of 0.5 W/(m·K) even when the evaporator 2 is arranged in the case 1. Therefore, dew drops less likely to generate on outer faces of the case 1.

Especially, in the case 1, since the condensed water flows through the drain port 14, the drain port 14 is cooled more than the other portion in the case 1. Because the drain port 14 is formed of the high foamed portion 21, it is effective to restrict generation of dew drops.

[Second Embodiment]

In the second embodiment, the high foamed portion 22 is formed in a manner different from that of the first embodiment.

Figure 4:
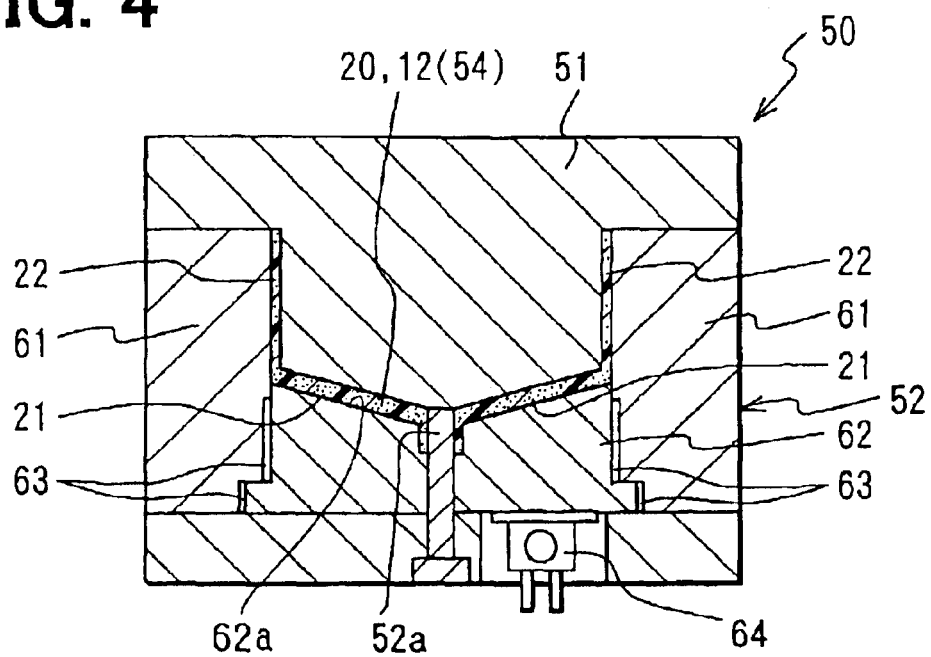
FIG. 4 is a schematic cross-sectional view of a mold assembly for explaining a manufacturing method according to the second embodiment of the present invention.

As shown in FIG. 4, the movable mold 52 includes a body portion 61 and an insert portion 62. A vibrator 64 is provided under the insert portion 62 as a vibrating device. The insert portion 62 vibrates by operation of the vibrator 64. Gaps 63 are defined partly between the body portion 61 and the insert portion 62 to restrict the body portion 61 from vibrating due to vibrations of the insert portion 62. As examples of the vibrator 64, an ultrasonic vibrator and air vibrator can be used.

When the second case 12 is molded, first, the resin 20 including the foaming agent is injected into the cavity 54 in a manner similar to the first embodiment. Then, the vibrator 64 is turned on to vibrate the insert portion 62. With this, a surface 62a of the insert portion 62, which defines the cavity 64, vibrates. Therefore, foam nucleation of the resin 20 is promoted at the vibrated portion. As a result, the expansion ratio of the vibrated portion is higher than the other portion.

In this way, the high foamed portion 21 and the low foamed portion 22 are formed integrally in the second case 12. Here, the step of vibrating the insert portion 62 corresponds to the foaming step.

Similar to the first embodiment, it is unnecessary to mold articles having different expansion ratio separately and to assemble them to construct the first case 11 and the second case 12. Therefore, the manufacturing method is simple. Also, the high foamed portions 21 are formed partly in the first case 11 and the second case 12. Therefore, it is possible to make the resin molded article compact.

[Third Embodiment]

In the third embodiment, the high foamed portion 21 is formed in a manner different from that of the first embodiment.

Figure 5:
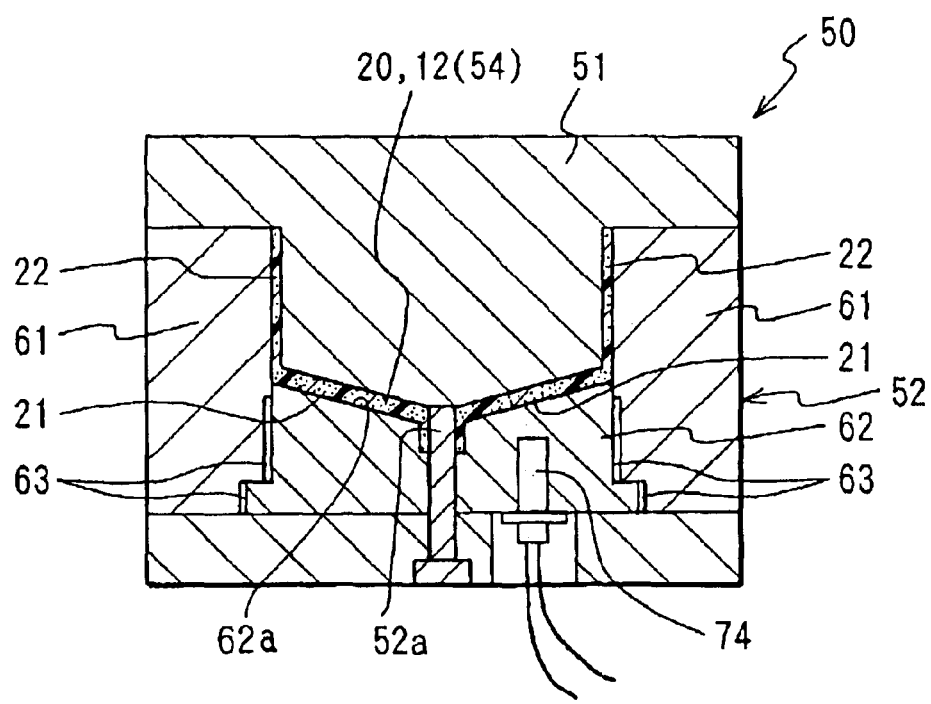
FIG. 5 is a schematic cross-sectional view of a mold assembly for explaining a manufacturing method according to the third embodiment of the present invention.

As shown in FIG. 5, the movable mold 52 includes the body portion 61 and the insert portion 62. An electric heater 74 is embedded in the insert portion 62 from the bottom. The electric heater 74 is a heating device and heats the insert portion 62 when it is electrically conducted. The gaps 63 are formed partly between the body portion 61 and the insert portion 62 to prevent the body portion 61 from receiving heat from the insert portion 62. Instead of the gaps 63, a heat insulation material can be provided between the body portion 61 and the insert portion 62.

When the insert portion 62 is heated by operation of the electric heater 74, the surface 62a of the insert portion 62, which defines the cavity 54, is heated and the temperature of the surface 62a is higher than the other surrounding walls. The electric heater 74 is a temperature difference-generating device to create temperature differences in walls defining the cavity 54.

In molding the second case 12, first, the resin 20 including the foaming agent is injected in the mold cavity 54 in a manner similar to the first embodiment. At this time, the insert portion 62 has been heated by the electric heater 74. In the embodiment, the body portion 61 is maintained at 15 degrees Celsius and the insert portion 62 is heated at 80 degrees Celsius. Thus, the nucleation is promoted at a part adjacent to the surface 62a that is approximately 80 degrees Celsius. As a result, the expansion ratio of the part adjacent to the surface 62a is higher than that of the other part.

In this way, the second case 12 in which the high foamed portion 21 and the low foamed portion 22 are integrally formed can be produced. FIG. 5 illustrates the injecting step and the foaming step of the method.

Also in this embodiment, it is unnecessary to separately mold the articles having different expansion ratios and to assemble them to construct the first case 11 and the second case 12. Therefore, the manufacturing process is simple. Also, the high foamed portions 21 are formed partly in the first case 11 and the second case 12. Therefore, the resin molded article is compact.

[Fourth Embodiment]

In the fourth embodiment, the high foamed portion 21 and the low foamed portion 22 are formed in a manner different from that of the first embodiment.

Figure 6A:
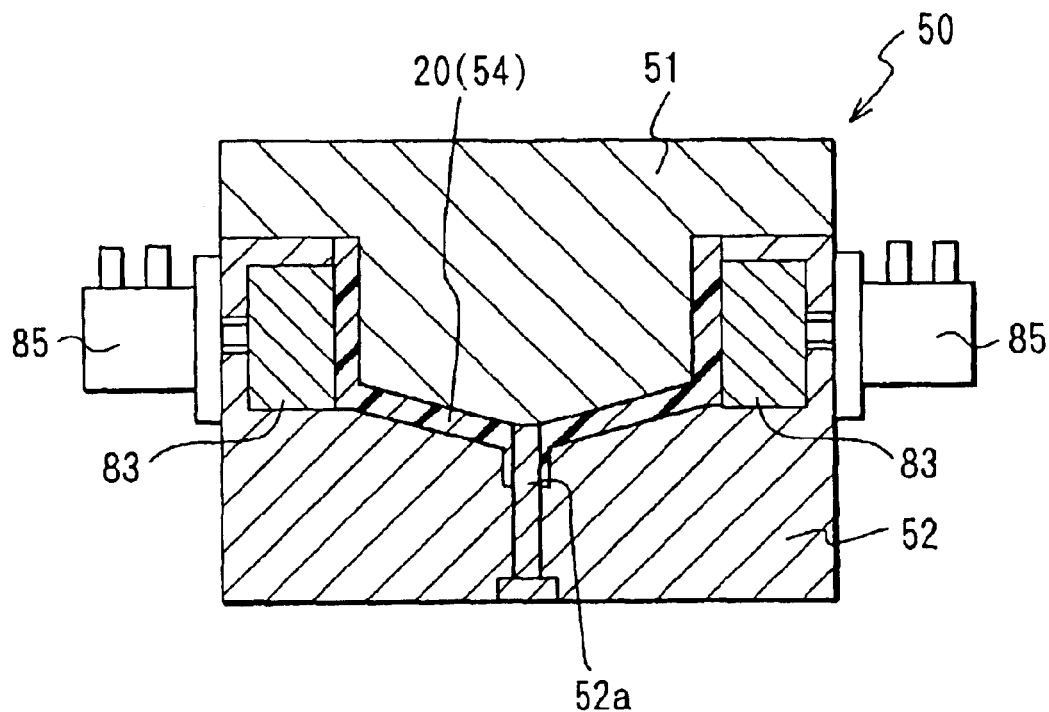
FIG. 6A is a schematic cross-sectional view of a mold assembly for explaining an injecting step of a manufacturing method according to the fourth embodiment of the present invention.

As shown in FIG. 6A, the movable mold 52 includes a plurality of movable cores 83. The movable cores 83 are supported slidably in the left and right direction in FIG. 6A. The movable cores 83 are respectively connected to actuators 85 that are provided on the outside of the movable mold 52 as a movable core driving means. The walls of the movable cores 83 defining the cavity 54 are moved by operation of the actuators 85 so that the volume of the cavity 54 is partly changed.

Figure 6B:
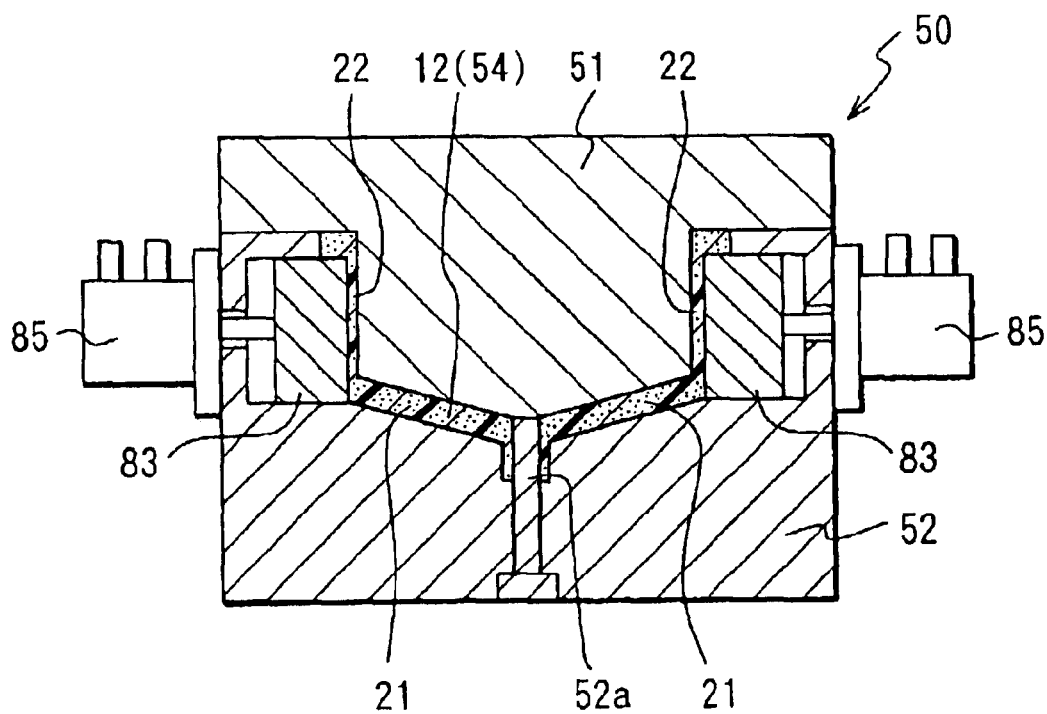
FIG. 6B is a schematic cross-sectional view of the mold assembly for explaining a foaming step according to the fourth embodiment of the present invention.

In molding the second case 12, first, the resin 20 including the foaming agent is injected into the cavity 54 in a manner similar to the first embodiment, as shown in FIG. 6A. Then, as shown in FIG. 6B, the movable cores 83 are moved by the actuators 85 inwardly, that is, in the direction that the volume of the cavity 54 is reduced. In the embodiment, the resin 20 is injected into the cavity 54 maintained at the mold temperature of 80 degrees Celsius. The movable cores 83 are moved approximately two seconds later the completion of the resin injection.

At the part where the volume of the cavity 54 is reduced, the nucleation in the resin 20 is limited and the foams grown therein are compressed. Therefore, the expansion ratio of the compressed part is smaller than the other parts.

In this way, the second case 12 in which the high foamed portion 21 and the low foamed portion 22 are integrally formed can be produced. In the embodiment, the step shown in FIG. 6A corresponds to the injecting step and the step shown in FIG. 6B corresponds to the foaming step.

Also in this embodiment, it is unnecessary to separately mold parts having different expansion ratios and to assemble the parts to construct the first case 11 and the second case 12. Therefore, the manufacturing process is simple. Also, the high foamed portions 21 are formed partly in the first case 11 and the second case 12, respectively. Therefore, it is possible to make the resin molded article compact.

As another modification, another supercritical liquid can be used as the foaming agent, in place of the supercritical liquid nitrogen. For example, the foaming agent can be supercritical liquid carbon dioxide. Further, the bowing agent is not limited to the supercritical liquid. For example, it can be a physical foaming agent that foams by evaporation. Also, it can be a chemical foaming agent that foams by cracked gas.

Figure 7:
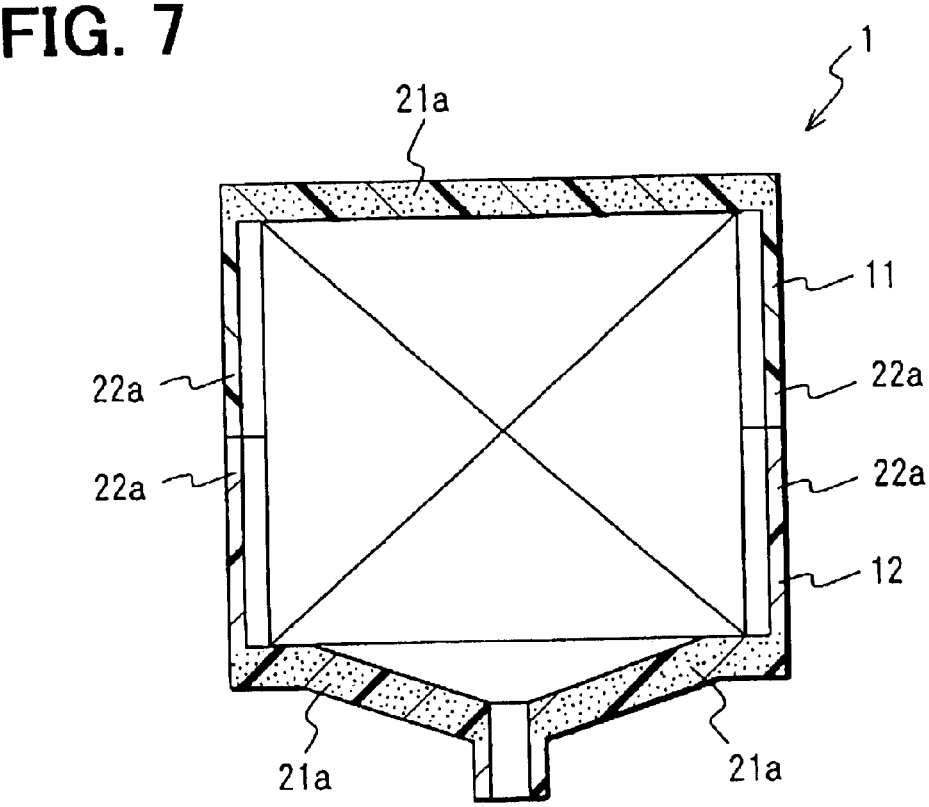
FIG. 7 is a schematic cross-sectional view of a air conditioning case produced by resin molding according to further another embodiment of the present invention.
Figure 8:
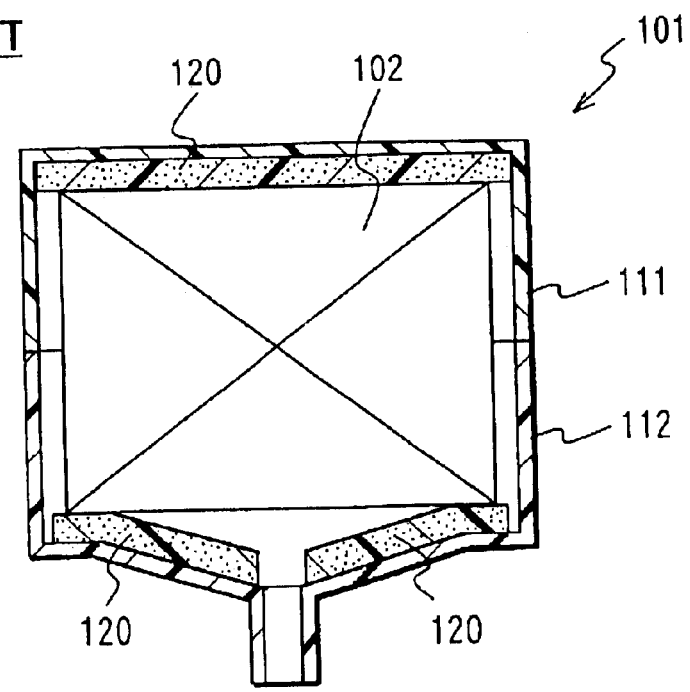
FIG. 8 is a schematic cross-sectional view of an air conditioning case produced by resin molding of a related art.

In the case 1 described in the above embodiments, the high foamed portions 21 and the low foamed portion 22 are integrally molded. However, the case 1 can be a molded article in which a foamed portion 21a defining voids therein and a non-foamed portion 22a without defining voids therein are integrally molded, as shown in FIG. 7. The non-foamed portion 22a is formed by avoiding foam nucleation in a method similar to that of the above-described embodiments.

In the third embodiment, the electric heater 74 is used as the heating device. However, another type of heater, such as a glow plug, can be used. Also, the heater 74 is used as a device to create temperature difference in the mold 50. However, the temperature difference can be created by other methods. For example, passages through which coolant (e.g. cold water) and heating medium (e.g. hot water) flow can be formed in the mold. By this, the temperature differences can be created on the walls of the mold defining the cavity.

The resin 20 is not limited to the polypropylene resin. Another resin material can be used to the present invention.

In the above-described embodiment, the movable core 53, vibrator 64, electric heater 74 and the movable cores 83, are arranged on a side of the movable mold 52. However, the arrangements are not limited to the above. Those can be arranged other positions, for example, in the fixed core 51.

Further, the devices, such as the movable the core 53, the actuator 55, the insert portion 62, the vibrator 64 and the electric heater 74, are used as foam-promoting devices to create expansion ratio differences in the singe molded article. Those devices can be used in variable combinations. In the above embodiments, the method is explained in a case of molding the air conditioning case as an example. The product is not limited to the air conditioning case. The method of the present invention can be used to produce molded articles for other purposes.

The present invention should not be limited to the disclosed embodiments, but may be implemented in other ways without departing from the spirit of the invention.

What is claimed is:

1. An air conditioning case which is molded by a resin injection through an injection gate into a mold portion having a predetermined mold inner shape in a mold assembly, the resin injection molded article comprising:
   a first wall defining voids therein; and
   a second wall having an aperture extending there through and having an expansion ratio less than that of the first wall, wherein,
   the first wall and the second wall are integral and have an outer shape including a surface and an edge, the entire outer shape coinciding with the predetermined mold inner shape of the mold portion, and wherein the first wall is thicker than the second wall.

2. The air conditioning case according to claim 1, wherein the first wall and the second wall form an air conditioning case having a drain port through which condensed water flows, wherein the drain port is formed in the first wall.

3. The air conditioning case according to claim 1, wherein the drain port is defined to have a pipe shape portion protruding from the first wall, and the pipe shape portion has a radial thickness thinner than the first wall.

4. The air conditioning case according to claim 3, wherein the first wall is arranged below an evaporator for cooling air passing therethrough and is inclined to flow condensed water of the evaporator toward the drain port, and wherein the second wall has a vertically extending side wall.

5. An air conditioning case comprising:
   a first wall defining voids therein; and
   a second wall having an expansion ratio less than that of the first wall,
   wherein the first wall and the second wall are integral,
   wherein the air conditioning case has a drain port through which condensed water flows, and
   wherein the drain port is formed in the first wall, and wherein the first wall is thicker than the second wall.

6. The air conditioning case according to claim 5, wherein the drain port is defined to have a pipe shape portion protruding from the first wall, and the pipe shape portion has a radial thickness thinner than the first wall.

7. The air conditioning case according to claim 6, wherein the first wall is arranged below an evaporator for cooling air passing therethrough and is inclined to flow condensed water of the evaporator toward the drain port, and wherein the second wall has a vertically extending side wall.

8. An air conditioning case comprising:
   a first wall defining voids therein; and
   a second wall having an expansion ratio less than that of the first wall, wherein:
   the first wall and the second wall are integral; and
   wherein the first wall has an aperture extending through the first wall, and wherein the first wall is thicker than the second wall.

9. The air conditioning case according to claim 8, wherein:
   the first wall and the second wall form an air conditioning case in which air flows; and
   the aperture is a drain port through which condensed water generated from an evaporator of the air conditioning case flows.

* * * * *